United States Patent

[11] 3,549,956

| [72] | Inventor | Hubert Polle |
| | | Munich, Germany |
| [21] | Appl. No. | 769,057 |
| [22] | Filed | Oct. 21, 1968 |
| [45] | Patented | Dec. 22, 1970 |
| [73] | Assignee | Siemens Aktiengesellschaft |
| | | Berlin and Munich, Germany |
| | | a corporation of Germany |
| [32] | Priority | Oct. 26, 1967 |
| [33] | | Germany |
| [31] | | No. S112578 |

[54] ELECTRICAL CONDENSOR WITH THIN REGENERABLE COATINGS AND METHOD OF MAKING THE SAME
11 Claims, 1 Drawing Fig.

[52] U.S. Cl. .................................................. 317/230,
317/260; 29/25.41
[51] Int. Cl. ........................................................ H01g 3/17
[50] Field of Search ............................................ 317/230,
233, 258, 260, 261; 29/25.41

[56] References Cited
UNITED STATES PATENTS

| 3,179,862 | 4/1965 | Dubilier .................. | 317/260 |
| 3,256,472 | 6/1966 | Centurioni ............... | 317/260 |
| 3,284,684 | 11/1966 | Gaenge .................... | 317/260 |
| 3,346,781 | 10/1967 | Maresi, Jr. et al. ....... | 317/230 |

Primary Examiner—James D. Kallam
Attorney—Hill, Sherman, Meroni, Gross & Simpson ABSTRACT: Electrical condenser bodies and method of making the same having a plurality of stacked dielectric foils covered with thin regenerable metal coatings arranged in staggered relationship with alternating lead edges which are consecutively coated with a plurality of metal layers that form alloys with each other.

PATENTED DEC 22 1970  3,549,956
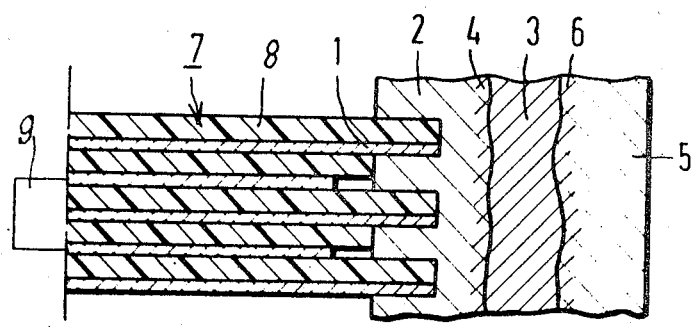
INVENTOR
Hubert Polle
BY
ATTYS.

ELECTRICAL CONDENSOR WITH THIN REGENERABLE COATINGS AND METHOD OF MAKING THE SAME

The present invention relates to electrical condensers composed of dielectric foils having thin regenerable metal coatings thereon and more particularly to electrical condensers of a type described having lead edges of metal coatings in contact with consecutive metal layers and the method of making the same.

Electrical condensers having this regenerable metal coatings are conventionally manufactured as coil or stack bodies. Condenser bodies having thin regenerable coatings must be electrically connected along the entire edge of such coatings since the coatings have high ohmic resistance. Generally, this is achieved by staggering the metallized dielectric foils so that one metal coating on a side of the condenser body and another metal coating on the other side of the condenser body are exposed for electrical contact. It is extremely difficult to establish satisfactory electrical contact between such exposed coating lead edges and outer current connectors, such as a lead-in wires.

German Pat. No. 946,302 suggests that exposed coating lead edges of such electrical condensers be coated with two different metal coats wherein the first metal in contact with the coating edge has a higher melting point than the second metal. However, this is unsatisfactory as thermal damage to the condenser results.

German Display Pat. No. 1,229,191 suggests that exposed coating lead edges of such electrical condensers be first coated with a copper layer and then coated with a metal having a lower melting point than copper, i.e. zinc. However, this is also unsatisfactory since the bonding between the metal layers is imperfect and materially detracts from the satisfactory operation of such condensers.

British Pat. Specification No. 560,946 suggests that exposed coating lead edges of such electrical condensers be composed of aluminum and that the lead edges be coated with a layer of copper. However, this is also unsatisfactory since insufficient contact or bonding between the exposed coating edges and the metal layer results.

Generally, the Schoop method governs the application of metals to the exposed coating lead edges of the described electrical condensers. According to the Schoop method, molten droplets of metal are sprayed, as by compressed air, onto the exposed coating edges of such electrical condensers. It has now been observed that as the molten metal droplets impact upon the condenser body, solidification tends to take place and the molten droplets have an outer solidified layer prior to actual impact. This observation has led to the conclusion that if other considerations are equal, the higher the melting point of the molten metal droplets, the thicker the outer solidified layer.

Thus, in electrical condensers where the metal selected to first contact the exposed metal coating lead edges (composed of, for example, aluminum) has a melting point substantially higher than the melting point of the coating, such as copper, the Schoop particles of such a metal are encrusted with a relatively thick solidified layer prior to impact. Naturally, such encrusted droplets exhibit poor adherence to the exposed coating edges and/or they penetrate too deep into the condenser body impairing its utility. Further, the use of these type metals result in a danger that, if the exposed coating edge consists of aluminum, the atoms of the coating will diffuse into the solidified layer of the Schoop droplets so that in the immediate area of contact between the coating and the droplets, the coating is destroyed. In addition, a substantial danger of thermal overloading of the condenser exists during the application operation.

If, as in other heretofore available electrical condensers, zinc is utilized as the metal to first contact the exposed aluminum coating edges (i.e. a metal having a melting point lower than aluminum), the molten droplets are still liquid upon impact with the aluminum coating. Such molten zinc only combines with the aluminum coating in a very limited extent since the solubility of zinc and solid-state aluminum is quite limited. Moreover, in such heretofore available electrical condensers, tin or a tin alloy is generally utilized as a solder material to connect the condenser body to outer electrical connecting wires. The solder material is applied as a second layer on top of the zinc layer. However, at relatively elevated temperatures (approximately at or above 85° C.) the bond between zinc and tin deteriorates under prolonged operating conditions. Apparently corrosions occur at the interface layer between the zinc and tin layers, which materially impair the efficiency of the condenser. Further, the interface between the exposed coating edge and the zinc layer is also adversely effected further impairing the efficiency of such condensers.

Accordingly, it is an important object of the invention to provide an improved electrical condenser having thin regenerable metal coatings overcoming the aforesaid disadvantages.

It is another object of the invention to provide an electrical condenser having exposed lead edges of thin regenerable metal coatings on a dielectric foil coated with a plurality of metal layers which are substantially thermally immune to produce excellent contact with outer contacting elements.

It is a further object of the invention to provide an electrical condenser comprising a plurality of dielectric foils having thin regenerable metal coatings thereon arranged in spaced relationship to define alternating lead edges and a plurality of consecutive metal layers attached to the lead edges forming alloys with each other.

Other objects, features and advantages will become more apparent with the teachings of the principles of the invention in connection with the disclosure of the preferred embodiments thereof in the specification, claims and drawing.

The single FIG. in the drawing is a schematic elevational view, with parts broken away for simplicity, illustrating a preferred embodiment of the electrical condenser constructed in accordance with the principles of the invention.

The present invention provides an electrical condenser comprised of a plurality of dielectric foils having thin regenerable metal coatings thereon arranged in spaced relationship to define alternating lead edges with a plurality of consecutive metal layers attached to the lead edges. The plurality of consecutive metal layers form alloys with each other at their respective interfaces.

Conventional dielectric foils are coated with relatively thin regenerable metal coatings, preferably composed of aluminum. The metallically coated dielectric foils are stacked one above the other in a staggered manner to define lead edges at opposite sides of the stack. The lead edges are intimately joined to consecutively applied metal layers which do not thermally damage the dielectric and provide intimate contact (by forming alloys with each other along their respective interfaces) with each other and the metallically coated dielectric foils.

The metal layers contacting the lead edges of the metallically coated dielectric foils must have a first metal layer contacting the lead edges, which has a melting point substantially equal to the melting point of the metal coating the dielectric. In this manner the application of such a first metal in a molten state to the lead edges of a stack of staggered metallically coated dielectric foils results in an intimate bond (or contact) formation between the applied metal and the coated metal as the mutual solubility between such metals is substantially unlimited and a monolithic metal mass results. In the preferred embodiments of the invention, the composition of the regenerable thin metal coating on the dielectric foil and that of the first metal layer is aluminum.

The second metal coating contacting the first metal must have a melting point relatively higher than the melting point of the first metal. In this manner, when such second metal is applied in its molten state, it will cause the outer surface of the first metal layer to melt and form an alloy with the second metal. The so-formed alloy interface produces an intimate, strong and long lasting bond between the metal layers. The second metal layer is preferably very thin and the sprayed-on molten droplets of such a second metal easily form a thin film on the first metal layer which tightly adheres thereto and dissipates the heat so that the termal load on the condenser is quite low and no damage occurs. Preferably, the second metal is an alloy forming material selected from the group consisting of copper, (including copper alloys) silver, and mixtures thereof.

The third metal contacting the second metal layer must be capable of fusing with the second metal and generally forming mixed crystals or intermetal phases therewith. In this manner, an intimate strong and long lasting bond between the second and third metal layers is established. The third metal also has a relatively lower melting point than the second metal and is suitable for use as a solder material with outer connecting members. Preferably, the third metal is a solder material selected from the class consisting of tin (including alloys of tin), zinc and mixtures thereof.

The invention consists essentially of utilizing a plurality of metal layers to contact lead edges of a staggered stack of metallically coated dielectric foils wherein the plurality of metal layers form alloys with each other to provide intimate contact between such lead edges and the metal layers.

The method of manufacturing the electrical condensers of the invention generally consist of providing a plurality of dielectric foils having relatively thin regenerable metal coatings thereon in a staggered stack relationship defining alternating lead edges and intimately attaching a plurality of consecutive metal layers to the lead edges whereby the metal layers form alloys with each other at their respective surfaces. More particularly, the method of making the electrical condenser body of the invention consists of arranging a plurality of dielectric foils having relatively thin regenerable metal coatings thereon in a staggered stack relationship defining alternating lead edges at opposite sides of the stack. Adjacent lead edges may then be electrically insulated in any conventional manner, such as providing an air gap or the like along one side of the stack. The exposed lead edges of the metallically coated dielectric foils are then contacted with a first molten metal having a melting point substantially equal to the melting point of the regenerable metal coating on the dielectric foil to form a solidified layer of said first metal on the regenerable metal coating with an alloy interface therebetween. Then a second molten metal having a melting point relatively higher than the melting point of the first metal layer is contacted with the solidified layer of the first metal to form a solidified layer of the second metal on the first metal with an alloy interface therebetween. Finally, a third molten metal having a melting point relatively lower then the melting point of the second metal is contacted with the solidified layer of the second metal to form a solidified layer of the third metal on the second metal with an alloy interface.

More particularly, aluminum is advantageously spray-applied in its molten state as the first metal layer contacting the lead edges (as defined hereinbefore) of a condenser body having aluminum coated dielectric foils arranged in a staggered relationship. The connection or bond between the lead edges of aluminum coating and the applied aluminum first metal layer is intimate, strong and stable because the mutual solubility between the impacting molten metal and the metallic coating on the dielectric is substantially unlimited.

A second metal layer is then spray-applied in its molten state on top of the first metal layer (after substantial solidification thereof). The second metal has a melting point relatively higher than the first metal and is preferably copper. The outer surface of the first metal (aluminum) layer melts upon contact with the molten copper and forms an alloy therewith as the interface of the first and second layers. In certain instances, mixed crystals or intermetal phases are produced during this process. In such instances, a continuous transfer between both metal layers is produced. As will be appreciated, the formation of mixed crystals or intermetal phases produces an extremely stable combination of metal layers which is even further stabilized by the diffusion occurring at higher operating temperatures. As indicated previously, the second metal layer is preferably very thin. Further, since the sprayed-on molten droplets easily burst and form a firmly adhering film thereof on the first metal layer, the thermal load on the condenser body is very low and nondamaging during such a coating procedure.

The third metal layer is then spray-applied in its molten state on top of the second (solidified) metal layer. The third metal has a relatively low melting point and relatively easily fuses with the second metal layer to form mixed crystals or intermetal phases therewith. Preferably, the third metal is tin. The relatively low melting point of the third metal (such as tin) makes it an ideal solder material for the outer connecting members. As indicated previously, in instances where copper is utilized as the second metal layer, it is advantageous to utilize tin as the third metal layer.

In order to more fully explain the invention, attention is directed to the single FIG. in the drawing. The alternating metallic lead edges 1 of a condenser body 7 (composed of a plurality of spaced dielectric foils 8 having thin regenerable metal, preferably aluminum, coatings 1 thereon) are contacted with a first metal layer 2, preferably composed of aluminum. The second metal layer 3, preferably composed of copper is applied to the first metal layer and forms an alloy therewith at the interface border 4. A third metal layer 5, preferably composed of tin, is applied to the second layer 3 and forms an alloy therewith at the interface border 6. It will be noted that alternating lead edges 1 are electrically connected to each other by means of first metal layer 2 and adjacent lead edges are electrically insulated from each other and the first metal layer 2. The drawing illustrates one-half of a condenser body for sake of simplicity since the other half is substantially identical to the one shown except that the lead edges which are insulated on a side shown are electrically connected, as at 9, on the other side and the lead edges electrically connected on the side shown are insulated on the opposing side.

As will be appreciated, the plurality of consecutive metal layers may be composed of any metal compatible (as explained hereinbefore) to the metal coating on the dielectric foils. For example, where the metal coating on the dielectric foils is aluminum and the first layer is also aluminum, the second layer may be an alloy material selected from the group consisting of copper (including copper alloys), silver and mixtures thereof, and the third layer may be a solder material selected from the group consisting of tin (including tin alloys), zinc and mixtures thereof.

It will be understood that modifications and variations may be effected without departing from the spirit and scope of the novel concepts of the present invention.

I claim:

1. An electrical condenser body comprising a plurality of dielectric foils having relatively thin metal coatings thereon, said dielectric foils arranged in overlying relationship with the lead edges of alternate foils extended at opposite sides, and a plurality of consecutive metal layers one on another attached to said lead edges and forming alloys with each other.

2. The electrical condenser body as defined in claim 1, wherein the plurality of dielectric foils having relatively thin metal coatings thereon are disposed in a first direction and a plurality of consecutive metal layers are disposed in a second direction.

3. The electrical condenser body as defined in claim 2, wherein the alternating lead edges of the dielectric foils having relatively thin metal coatings thereon contact a single metal layer of the plurality of consecutive metal layers.

4. An electrical condenser body comprising, a plurality of dielectric foils, a plurality of relatively thin metal coatings supported by said dielectric foils and separated thereby to define a plurality of metallically coated dielectric foils, said coated dielectric foils being arranged in staggered overlying relationship with each other defining alternating lead edges, a first metal layer in intimate contact with said lead edges having a melting point substantially equal to the melting point of the metal coating on the dielectric foil, a second metal layer in intimate contact with said first metal layer having a melting point relatively higher than the melting point of said first metal layer, and a third metal layer in intimate contact with said second metal layer having a melting point relatively lower than the melting point of said second metal layer, the metal layers defining alloys with each other in the area of contact.

5. The electrical condenser body as defined in claim 4, wherein the relatively thin metal coating and the first metal layer in intimate contact with the alternating lead edges are composed essentially of aluminum.

6. The electrical condenser body as defined in claim 5, wherein the second metal layer consists essentially of an alloy forming material selected from the group consisting essentially of silver, copper and mixtures thereof and the third metal layer consists essentially of a solder material selected from the group consisting essentially of zinc, tin and mixtures thereof.

7. An electrical condenser body comprising, a dielectric foil, a relatively thin aluminum coating on said foil, a layer of aluminum in intimate contact with said thin aluminum coating, a layer of copper in intimate contact with said layer of aluminum, and a layer of tin in intimate contact with said layer of copper.

8. An electrical condenser body comprising, a plurality of dielectric foils having relatively thin metal coatings thereon, said foils being stacked in a staggered overlying relationship to define alternating lead edges at opposite sides of a condenser body, a first plurality of consecutive metal layers in intimate contact with the lead edges of a side of the condenser body, a second plurality of consecutive metal layers in intimate contact with the lead edges of the opposite side of the condenser body, said lead edges contacting a single metal layer of said plurality of consecutive metal layers with adjacent lead edges being electrically insulated from one another and alternating lead edges being electrically connected with each other.

9. The electrical condenser body as defined in claim 8, wherein the thin metal thin coating is composed of aluminum and the plurality of consecutive metal layers are composed of a first layer of aluminum, a second layer of an alloy forming material selected from the group consisting of silver, copper and mixtures thereof, and a third layer of solder material selected from the group consisting essentially of zinc, tin and mixtures thereof.

10. A method of making an electrical condenser body comprising (1) arranging a plurality of dielectric foils having relatively thin metal coatings thereon in a staggered overlying stack relationship defining alternating lead edges at opposed sides of the stack, (2) electrically insulating adjacent lead edges along one side of the stack, (3) contacting said lead edges with a first molten metal having a melting point substantially equal to the melting point of said thin metal coating to form a solidified layer of said first metal on said thin metal coating with an alloy interface therebetween, (4) contacting the solidified layer of said first metal with a second molten metal having a melting point relatively higher than the melting point of said first metal layer to form a solidified layer of said second metal on said first metal with an alloy interface therebetween, and (5) contacting the solidified layer of said second metal with a third molten metal having a melting point relatively lower than the melting point of the second metal to form a solidified layer of the third metal on said second metal with an alloy interface therebetween.

11. A method of making an electrical condenser body comprising (1) providing a plurality of dielectric foils having relatively thin metal coatings thereon in a staggered overlying stack relationship defining alternating lead edges, and (2) intimately attaching in alloy-forming relationship a plurality of consecutive metal layers to said lead edges.